(12) United States Patent
Higashide et al.

(10) Patent No.: US 11,958,490 B2
(45) Date of Patent: Apr. 16, 2024

(54) OPERATION MANAGEMENT APPARATUS, SYSTEM, OPERATION MANAGEMENT METHOD, AND NON-TRANSITORY COMPUTER READABLE MEDIUM

(71) Applicant: TOYOTA JIDOSHA KABUSHIKI KAISHA, Toyota (JP)

(72) Inventors: Hiroshi Higashide, Nagoya (JP); Keiichi Uno, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 17/506,160

(22) Filed: Oct. 20, 2021

(65) Prior Publication Data

US 2022/0118992 A1    Apr. 21, 2022

(30) Foreign Application Priority Data

Oct. 21, 2020    (JP) .................................. 2020-176951

(51) Int. Cl.
*B60W 50/00* (2006.01)
*B60W 50/02* (2012.01)
*B60W 50/029* (2012.01)
*B60W 60/00* (2020.01)
*G08G 1/00* (2006.01)
*G08G 1/127* (2006.01)

(52) U.S. Cl.
CPC ...... *B60W 50/029* (2013.01); *B60W 50/0205* (2013.01); *B60W 60/001* (2020.02); *G08G 1/127* (2013.01); *G08G 1/20* (2013.01)

(58) Field of Classification Search
CPC ................ G06Q 10/00; B60W 60/001; B60W 50/0205; B60W 50/029; G08G 1/127
USPC .......................................................... 705/7.22
See application file for complete search history.

(56) References Cited

U.S. PATENT DOCUMENTS

| | | | |
|---|---|---|---|
| 6,728,630 B1 * | 4/2004 | Burt .................. | G08G 1/096838 701/428 |
| 10,762,791 B2 * | 9/2020 | Switkes ............... | G05D 1/0289 |
| 11,079,245 B1 * | 8/2021 | Niewiadomski ... | G01C 21/3492 |
| 2009/0254405 A1 * | 10/2009 | Hollis .............. | G06Q 10/06315 705/7.25 |
| 2020/0312149 A1 | 10/2020 | Umeda | |
| 2022/0187081 A1 * | 6/2022 | Fujita .................. | G01C 21/3415 |

FOREIGN PATENT DOCUMENTS

| | | |
|---|---|---|
| JP | S54-71600 A | 6/1979 |
| JP | 2020-013379 A | 1/2020 |
| JP | 2020-160836 A | 10/2020 |

* cited by examiner

*Primary Examiner* — Mustafa Iqbal
(74) *Attorney, Agent, or Firm* — Oliff PLC

(57) ABSTRACT

An operation management apparatus includes a controller configured to determine, in a case in which a first vehicle that has been operated in accordance with a schedule specifying a point in time at which a circulating vehicle is to be replaced becomes inoperable, whether to operate a second vehicle that substitutes for the first vehicle until a replacement time specified by the schedule, the replacement time being a point in time at which the first vehicle is to be replaced.

13 Claims, 8 Drawing Sheets

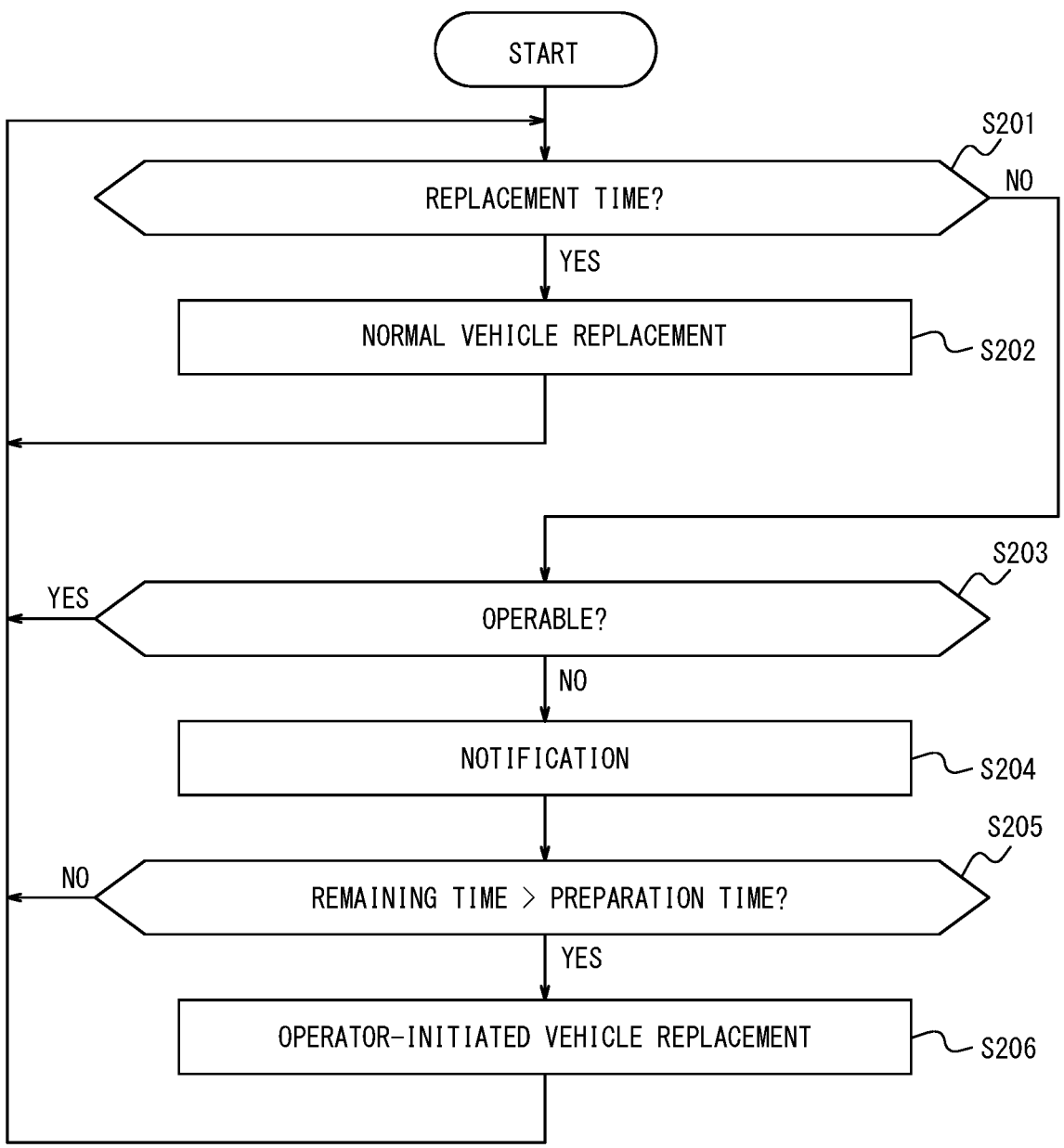

OPERATION MANAGEMENT APPARATUS, SYSTEM, OPERATION MANAGEMENT METHOD, AND NON-TRANSITORY COMPUTER READABLE MEDIUM

CROSS-REFERENCE TO RELATED APPLICATION

This application claims priority to Japanese Patent Application No. 2020-176951, filed on Oct. 21, 2020, the entire contents of which are incorporated herein by reference.

TECHNICAL FIELD

The present disclosure relates to an operation management apparatus, a system, an operation management method, and a program.

BACKGROUND

Patent Literature (PTL) 1 discloses technology relating to replacement of circulating electric vehicles.

CITATION LIST

Patent Literature

PTL 1: JP 2020-013379 A

SUMMARY

A circulating electric vehicle may be replaced every N laps to perform maintenance such as charging, where N is an integer equal to or greater than 1; however, in a case in which a vehicle becomes inoperable due to a cause such as failure, operation might be suspended for a long time until the next vehicle replacement.

It would be helpful to enable implementation of operator-initiated vehicle replacement separately from normal vehicle replacement.

An operation management apparatus according to the present disclosure includes a controller configured to determine, in a case in which a first vehicle that has been operated in accordance with a schedule specifying a point in time at which a circulating vehicle is to be replaced becomes inoperable, whether to operate a second vehicle that substitutes for the first vehicle until a replacement time specified by the schedule, the replacement time being a point in time at which the first vehicle is to be replaced.

An operation management method according to the present disclosure includes determining, by an operation management apparatus, in a case in which a first vehicle that has been operated in accordance with a schedule specifying a point in time at which a circulating vehicle is to be replaced becomes inoperable, whether to operate a second vehicle that substitutes for the first vehicle until a replacement time specified by the schedule, the replacement time being a point in time at which the first vehicle is to be replaced.

A program according to the present disclosure is configured to cause a computer to execute operations, the operations comprising determining, in a case in which a first vehicle that has been operated in accordance with a schedule specifying a point in time at which a circulating vehicle is to be replaced becomes inoperable, whether to operate a second vehicle that substitutes for the first vehicle until a replacement time specified by the schedule, the replacement time being a point in time at which the first vehicle is to be replaced.

According to the present disclosure, operator-initiated vehicle replacement can be implemented separately from normal vehicle replacement.

BRIEF DESCRIPTION OF THE DRAWINGS

In the accompanying drawings:

FIG. 8 is a flowchart illustrating operations of the system according to a variation of the embodiment of the present disclosure.

DETAILED DESCRIPTION

Figure 1:
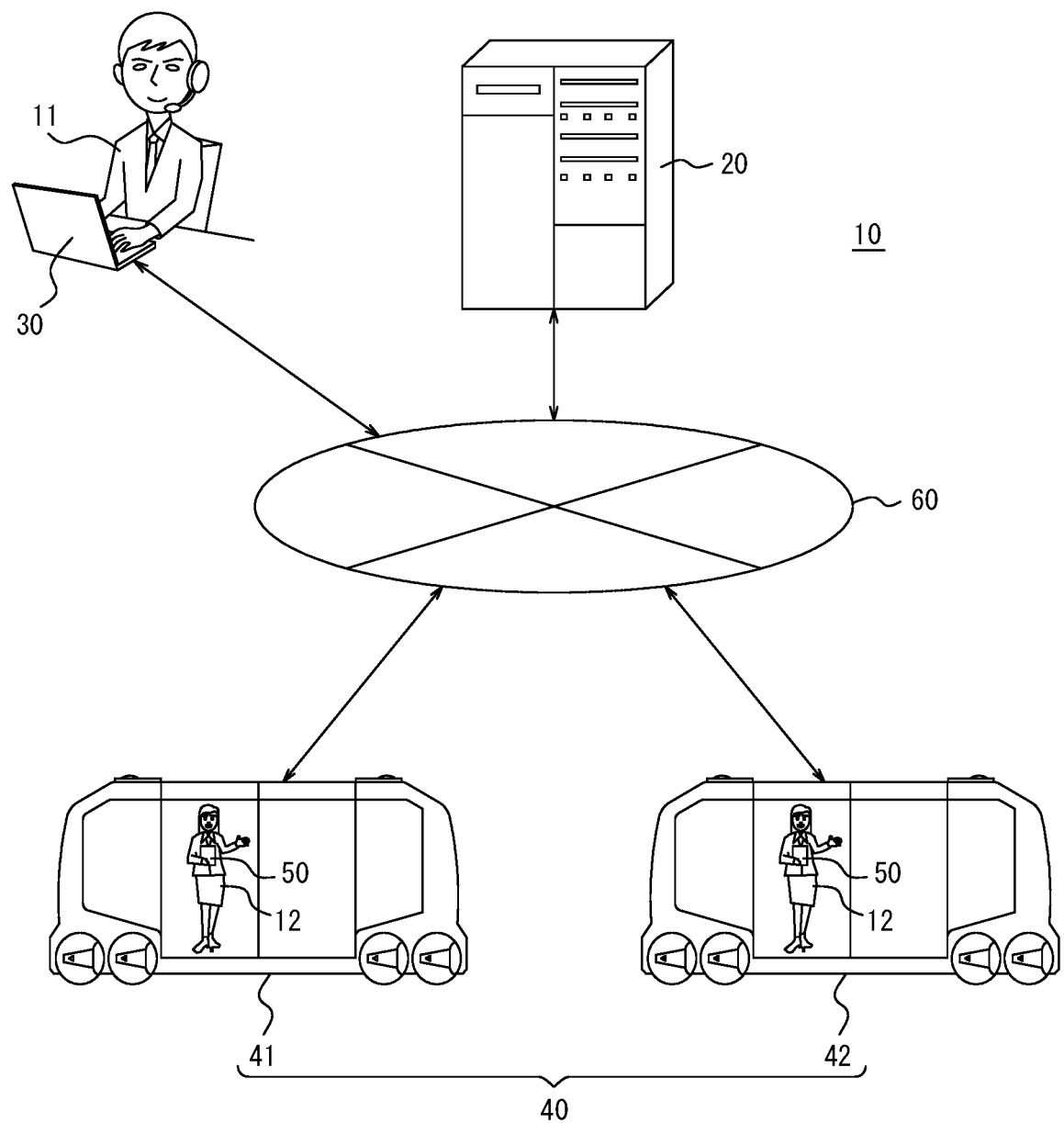
FIG. 1 is a diagram illustrating a configuration of a system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 includes at least one operation management apparatus 20, at least one first terminal apparatus 30, a plurality of vehicles 40, and a plurality of second terminal apparatuses 50. The operation management apparatus 20 can communicate with the first terminal apparatus 30, the plurality of vehicles 40, and the plurality of second terminal apparatuses 50 via a network 60. The first terminal apparatus 30 may be able to communicate with the plurality of vehicles 40 and the plurality of second terminal apparatuses 50. Each vehicle 40 may be able to communicate with a corresponding second terminal apparatus 50.

The operation management apparatus 20 is installed in a facility such as a data center. The operation management apparatus 20 is a computer such as a server that belongs to a cloud computing system or another type of computing system.

The first terminal apparatus 30 is installed in an operation management room and is used by a manager 11 who manages the operation of the plurality of vehicles 40. The first terminal apparatus 30 is, for example, a general purpose device such as a PC, or a dedicated device. The term "PC" is an abbreviation of personal computer.

The plurality of vehicles 40 is operated in accordance with a schedule so as to circulate. A schedule is a plan that specifies the points in time at which circulating vehicles 40 are to be replaced. The schedule may specify when and where each vehicle 40 should be located. The "where" includes, for example, the point from which each vehicle 40 is to depart, the points at which each vehicle 40 is to stop for passengers to board or alight, or the point at which each vehicle 40 is to ultimately arrive. The "when" includes, for example, the time corresponding to each point, that is, the time at which each vehicle 40 is to depart, the times at which each vehicle 40 is to stop for passengers to board or alight, or the time at which each vehicle 40 is to ultimately arrive. In the schedule, the stop duration for each vehicle 40 may be specified for each point at which each vehicle 40 is to stop.

Each vehicle 40 is, for example, any type of automobile such as a gasoline vehicle, a diesel vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. Each vehicle 40, which is an AV in the present embodiment, may be driven by a driver, or the driving may be automated at any level. The term "AV" is an abbreviation of autonomous vehicle. The automation level is, for example, any one of Level 1 to Level 5 according to the level classification defined by SAE. The name "SAE" is an abbreviation of Society of Automotive Engineers. Each vehicle 40 may be a MaaS-dedicated vehicle. The term "MaaS" is an abbreviation of Mobility as a Service.

Each second terminal apparatus 50 is held by a crew member 12 who assists in the operation of the corresponding vehicle 40, and used by the crew member 12. Each second terminal apparatus 50 is, for example, a mobile device such as a mobile phone, a smartphone, or a tablet.

The network 60 includes the Internet, at least one WAN, at least one MAN, or any combination thereof. The term "WAN" is an abbreviation of wide area network. The term "MAN" is an abbreviation of metropolitan area network. The network 60 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

As a variation of the present embodiment, the first terminal apparatus 30 may be held by the manager 11 instead of being installed in the operation management room. In such a variation, the first terminal apparatus 30 is, for example, a mobile device such as a mobile phone, a smartphone, or a tablet.

As a variation of the present embodiment, each second terminal apparatus 50 may be mounted in the corresponding vehicle 40 instead of being held by the crew member 12. In such a variation, each second terminal apparatus 50 is, for example, a car navigation device or a dedicated device.

An outline of the present embodiment will be described with reference to FIG. 1.

The operation management apparatus 20 determines, in a case in which a first vehicle 41 that has been operated in accordance with a schedule specifying a point in time at which a circulating vehicle 40 is to be replaced becomes inoperable, whether to operate a second vehicle 42 that substitutes for the first vehicle 41 until a replacement time specified by the schedule, the replacement time being a point in time at which the first vehicle 41 is to be replaced. Therefore, according to the present embodiment, operator-initiated vehicle replacement can be implemented separately from normal vehicle replacement.

In a case in which the second vehicle 42 will not be ready for introduction by the replacement time, such as a case in which the first vehicle 41 is on its last lap, forced vehicle replacement will result in a conflict between normal vehicle replacement and operator-initiated vehicle replacement. However, in the present embodiment, the operation management apparatus 20 determines whether to operate the second vehicle 42 until the replacement time according to the remaining number of laps for the first vehicle 41, until the replacement time, at the point in time at which the first vehicle 41 becomes inoperable. Therefore, according to the present embodiment, a conflict between normal vehicle replacement and operator-initiated vehicle replacement can be prevented.

Figure 2:
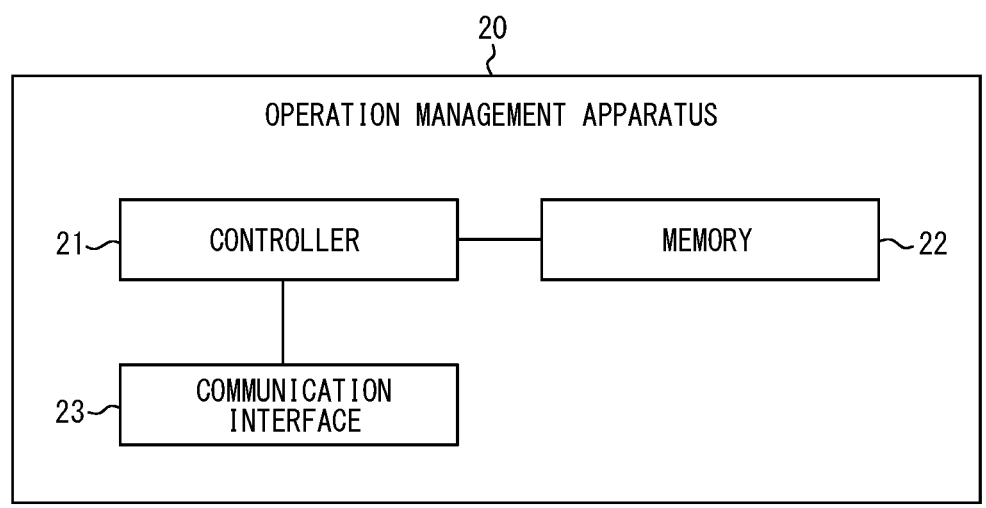
FIG. 2 is a block diagram illustrating a configuration of an operation management apparatus according to the embodiment of the present disclosure.

A configuration of the operation management apparatus 20 according to the present embodiment will be described with reference to FIG. 2.

The operation management apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the operation management apparatus 20 while controlling components of the operation management apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the operation management apparatus 20 and data obtained by the operations of the operation management apparatus 20.

The communication interface 23 includes at least one interface for communication. The interface for communication is, for example, a LAN interface. The communication interface 23 receives data to be used for the operations of the operation management apparatus 20, and transmits data obtained by the operations of the operation management apparatus 20.

The functions of the operation management apparatus 20 are realized by execution of a program according to the present embodiment by a processor serving as the controller 21. That is, the functions of the operation management apparatus 20 are realized by software. The program causes a computer to execute the operations of the operation management apparatus 20, thereby causing the computer to function as the operation management apparatus 20. That is, the computer executes the operations of the operation management apparatus 20 in accordance with the program to thereby function as the operation management apparatus 20.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the operation management apparatus 20 may be realized by a programmable circuit or a dedicated circuit serving as the controller 21. That is, some or all of the functions of the operation management apparatus 20 may be realized by hardware.

Operations of the system 10 according to the present embodiment will be described with reference to FIG. 3. These operations correspond to an operation management method according to the present embodiment.

In step S101, the controller 21 of the operation management apparatus 20 refers to a schedule specifying a point in time at which a circulating vehicle 40 is to be replaced. The schedule is stored in advance in the memory 22 of the operation management apparatus 20 or in external storage. The controller 21 determines whether the current time is a replacement time. The replacement time is a point in time, as specified by the schedule, at which a first vehicle 41 is to be replaced. The first vehicle 41 is a vehicle 40 that is circulating at the current time. In a case in which the current time is the replacement time, the controller 21 determines to implement normal vehicle replacement at the current time. The process in step S102 is then executed. In a case in which the current time is not the replacement time, the controller 21 determines not to implement normal vehicle replacement at the current time. The process in step S103 is then executed.

In step S102, normal vehicle replacement is implemented. The normal vehicle replacement may be implemented in any procedure, but in the present embodiment, is implemented in the following procedure.

The controller 21 of the operation management apparatus 20 controls the communication interface 23 to transmit first instruction data instructing that vehicle replacement be implemented. The communication interface 23 transmits the first instruction data to the first vehicle 41 and a replacement vehicle. The replacement vehicle is a vehicle 40, as specified by the schedule, that is to start circulating in place of the first vehicle 41.

Figure 4:
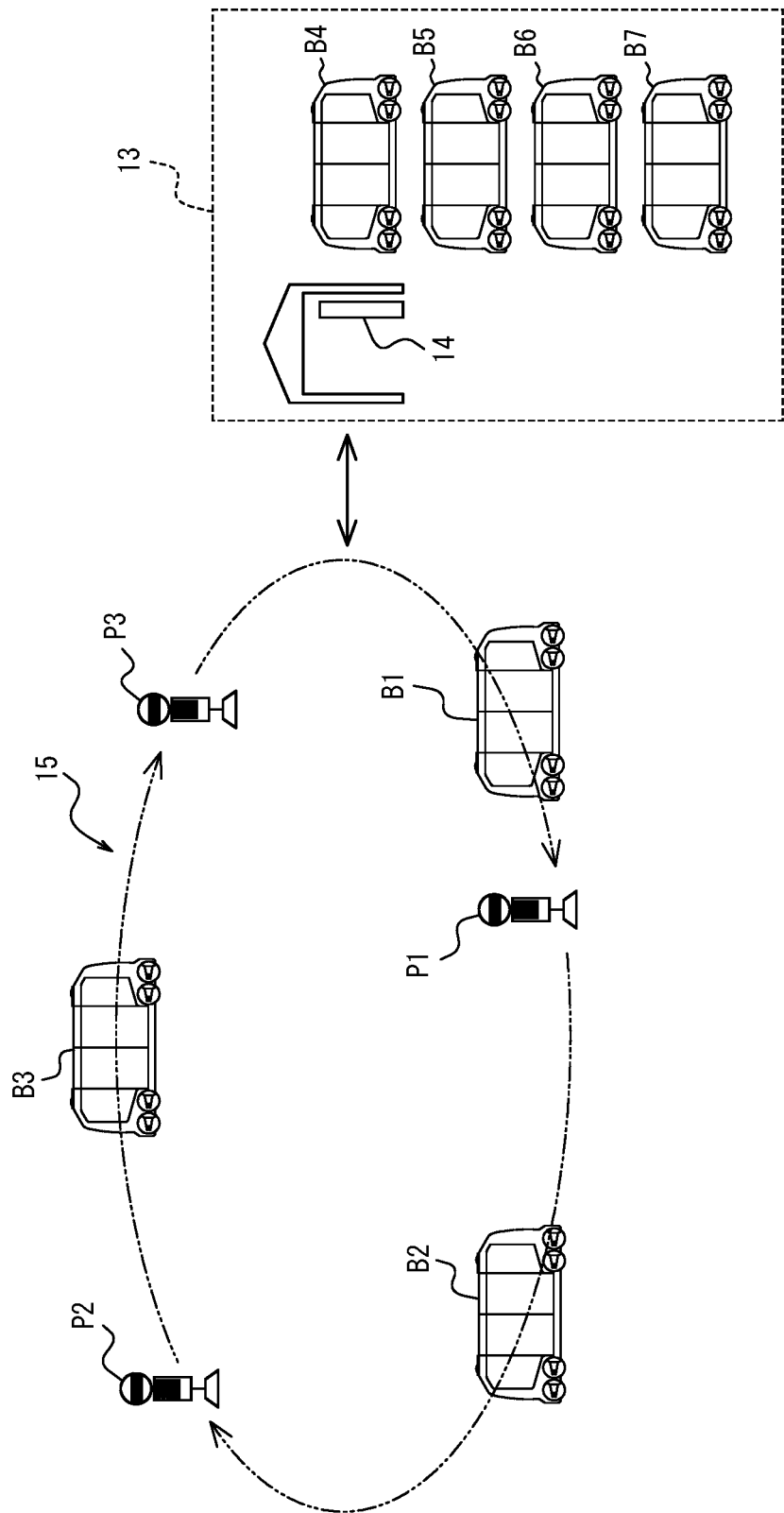
FIG. 4 is a diagram illustrating an example of a route traversed by vehicles according to the embodiment of the present disclosure.

The first vehicle 41 receives the transmitted first instruction data from the operation management apparatus 20 via an interface compliant with a mobile communication standard such as LTE, the 4G standard, or the 5G standard. The term "LTE" is an abbreviation of Long Term Evolution. The term "4G" is an abbreviation of 4th generation. The term "5G" is an abbreviation of 5th generation. The first vehicle 41 stops circulating in accordance with the received first instruction data and returns to a garage 13 as illustrated in FIG. 4.

The replacement vehicle receives the transmitted first instruction data from the operation management apparatus 20 via an interface compliant with a mobile communication standard such as LTE, the 4G standard, or the 5G standard. The replacement vehicle leaves the garage 13 in accordance with the received first instruction data and starts circulating. From this point on, the replacement vehicle becomes the first vehicle 41.

After the vehicle replacement, the process in step S101 is executed again.

In step S103, the controller 21 of the operation management apparatus 20 determines whether the first vehicle 41 is operable. This process may be executed in any procedure, but in the present embodiment, is executed in the following procedure.

The controller 21 of the operation management apparatus 20 controls the communication interface 23 to transmit query data inquiring whether the first vehicle 41 is operable. The communication interface 23 transmits the query data to the first vehicle 41.

The first vehicle 41 receives the transmitted query data via the interface compliant with the mobile communication standard. In response to the received query data, the first vehicle 41 transmits status data indicating whether the first vehicle 41 is operable to the operation management apparatus 20 via the interface compliant with the mobile communication standard. In a case in which the first vehicle 41 becomes inoperable due to a cause such as failure, the first vehicle 41 may independently detect its inoperability, or may be notified of its inoperability by the crew member 12. In the latter case, the first vehicle 41 receives data notifying that the first vehicle 41 has become inoperable from a corresponding second terminal apparatus 50 via the interface compliant with the mobile communication standard or an interface compliant with a short-range wireless communication standard such as Bluetooth® (Bluetooth is a registered trademark in Japan, other countries, or both).

The communication interface 23 of the operation management apparatus 20 receives the transmitted status data from the first vehicle 41. The controller 21 of the operation management apparatus 20 acquires the status data received by the communication interface 23. The controller 21 determines whether the first vehicle 41 is operable by referring to the acquired status data.

The status data may be transmitted from the first vehicle 41 to the operation management apparatus 20 without a query from the operation management apparatus 20. For example, the status data may be transmitted from the first vehicle 41 to the operation management apparatus 20 periodically or when an event that affects the operation of the first vehicle 41 occurs, such as failure.

In a case in which the first vehicle 41 is operable, the process in step S101 is executed again. In a case in which the first vehicle 41 is inoperable, the process in step S104 is executed.

In step S104, the controller 21 of the operation management apparatus 20 notifies the manager 11 that the first vehicle 41, which has been operated in accordance with the schedule, has become inoperable. This process may be executed in any procedure, but in the present embodiment, is executed in the following procedure.

The controller 21 of the operation management apparatus 20 controls the communication interface 23 to transmit notification data notifying that the first vehicle 41 has become inoperable. The communication interface 23 transmits the notification data to the first terminal apparatus 30.

The first terminal apparatus 30 receives the transmitted notification data from the operation management apparatus 20 via a LAN interface or an interface compliant with a mobile communication standard such as LTE, the 4G standard, or the 5G standard. The first terminal apparatus 30 displays the received notification data on a display such as an LCD or an organic EL display. The term "LCD" is an abbreviation of liquid crystal display. The term "EL" is an abbreviation of electro luminescence. The first terminal apparatus 30 accepts, from the manager 11, an operation to select whether to introduce a second vehicle 42 that substitutes for the first vehicle 41 via an interface such as a physical key, a capacitive key, a pointing device, a touch screen integrally provided with the display, or a microphone. In a case in which introduction of the second vehicle 42 is selected, the first terminal apparatus 30 transmits, to the operation management apparatus 20 via the LAN interface or the interface compliant with the mobile communication standard, request data requesting that operator-initiated vehicle replacement be implemented.

The communication interface 23 of the operation management apparatus 20 receives the transmitted request data from the first terminal apparatus 30. The controller 21 of the operation management apparatus 20 acquires the request data received by the communication interface 23.

In step S105, the controller 21 of the operation management apparatus 20 compares the remaining number of laps for the first vehicle 41, until the replacement time, at the point in time at which the first vehicle 41 becomes inoperable, with a threshold Th. The threshold Th is 1 in the present embodiment, but may be 2. In a case in which the remaining number of laps is less than the threshold Th, the controller 21 determines not to operate the second vehicle 42 until the replacement time. That is, the controller 21 determines not to implement operator-initiated vehicle replacement. Specifically, even if the request data is acquired in step S104, the controller 21 determines not to comply with a request from the manager 11, and notifies the manager 11 of non-compliance with the request. The process in step S101 is then executed again. In a case in which the remaining number of laps is equal to or greater than the threshold Th, the controller 21 determines to operate the second vehicle 42 until the replacement time. That is, the controller 21 determines to implement operator-initiated vehicle replacement. Specifically, if the request data is acquired in step S104, the controller 21 determines to comply with a request from the manager 11, and notifies the manager 11 of compliance with the request. The process in step S106 is then executed. If request data is not acquired in step S104, the controller 21 may determine not to implement operator-initiated vehicle replacement. In that case, the process in step S101 is executed again.

In step S106, operator-initiated vehicle replacement is implemented. The operator-initiated vehicle replacement may be implemented in any procedure, but in the present embodiment, is implemented in the following procedure.

The controller 21 of the operation management apparatus 20 controls the communication interface 23 to transmit second instruction data instructing that vehicle replacement be implemented. The communication interface 23 transmits the second instruction data to the first vehicle 41 and the second vehicle 42. The second vehicle 42 is a vehicle 40 that starts circulating in place of the first vehicle 41 but that is not specified by the schedule, unlike a mere replacement vehicle.

The first vehicle 41 receives the transmitted second instruction data from the operation management apparatus 20 via the interface compliant with the mobile communication standard. The first vehicle 41 returns to the garage 13 in accordance with the received second instruction data. Alternatively, the first vehicle 41 is returned to the garage 13 by a tow vehicle in a case in which the first vehicle 41 is unable to return on its own.

The second vehicle 42 receives the transmitted second instruction data from the operation management apparatus 20 via an interface compliant with a mobile communication standard such as LTE, the 4G standard, or the 5G standard. The second vehicle 42 leaves the garage 13 in accordance with the received second instruction data and starts circulating. From this point on, the second vehicle 42 becomes the first vehicle 41.

After the vehicle replacement, the process in step S101 is executed again.

A specific example of the operations of the system 10 according to the present embodiment will be described with reference to FIGS. 4 to 7.

As illustrated in FIG. 4, in this example, among seven circulating buses each corresponding to a vehicle 40, three circulating buses circulate along a route 15, and the remaining four circulating buses are on standby at the garage 13. Each circulating bus is an AV that can be operated without a driver. Each circulating bus is also a BEV and is charged using a charging facility 14 in the garage 13 while on standby. Each circulating bus departs from the garage 13, stops at stops P1, P2, and P3 on the route 15 for passengers to board and alight, and ultimately arrives at the garage 13, in accordance with the schedule.

Figure 5:
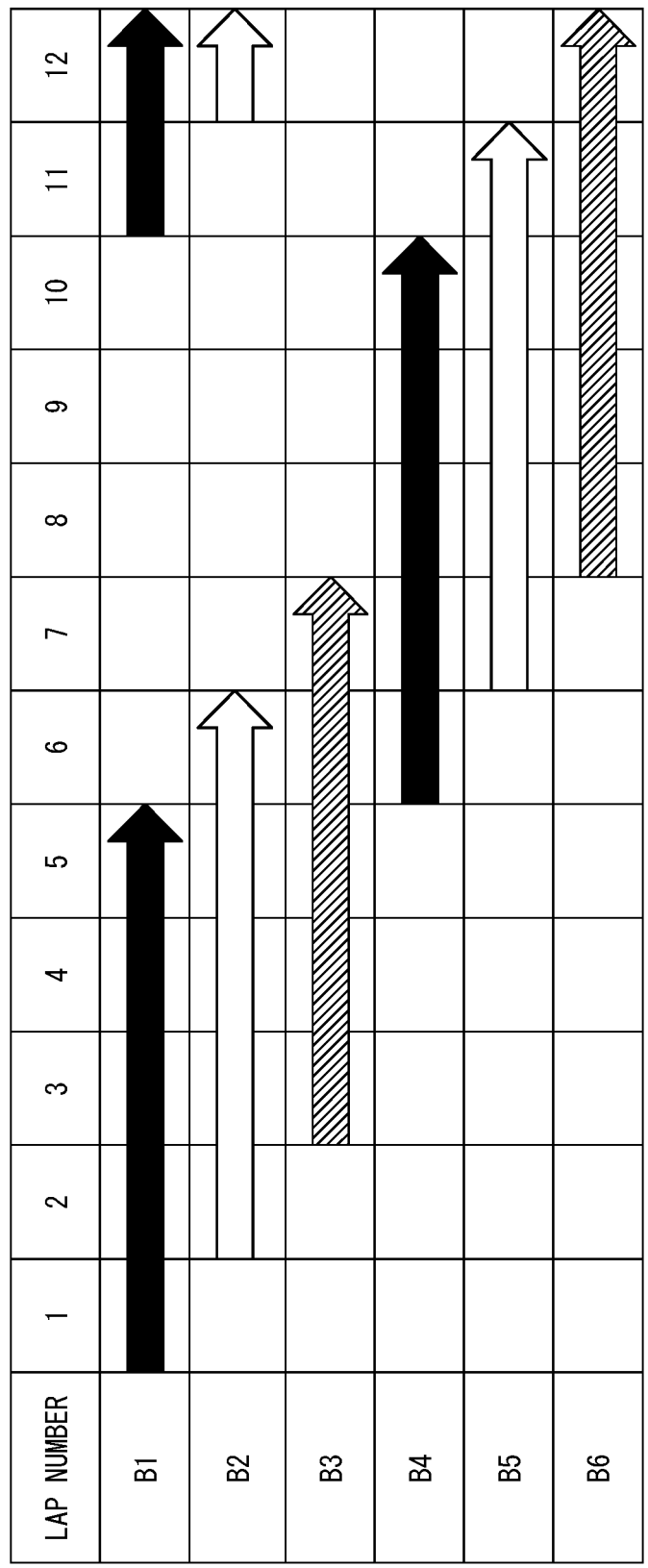
FIG. 5 is a diagram illustrating an example of a schedule for operating the vehicles according to the embodiment of the present disclosure.

As illustrated in FIG. 5, in this example, circulating buses B1, B2, and B3 leave the garage 13 in order, each one lap behind the preceding bus. The circulating buses B1, B2, and B3 each do five laps on the route 15 and return to the garage 13 in order. To replace the circulating buses B1, B2, and B3 upon their return to the garage 13, circulating buses B4, B5, and B6 leave the garage 13 in order, each one lap behind the preceding bus. The circulating buses B4, B5, and B6 each do five laps on the route 15 and return to the garage 13 in order. To replace the circulating buses B4, B5, and B6 upon their return to the garage 13, the circulating buses B1, B2, and B3 leave the garage 13 again in order, each one lap behind the preceding bus. Thereafter, operation of the circulating buses is repeated in the same manner.

The schedule specifies what time each circulating bus should leave the garage 13, what time to arrive at the stops P1, P2, and P3, how many minutes to be stopped, and what time to return to the garage 13. In this example, when each circulating bus stops at the stop P3 just before returning to the garage 13, all passengers must alight, and no one is allowed to board.

Figure 6:
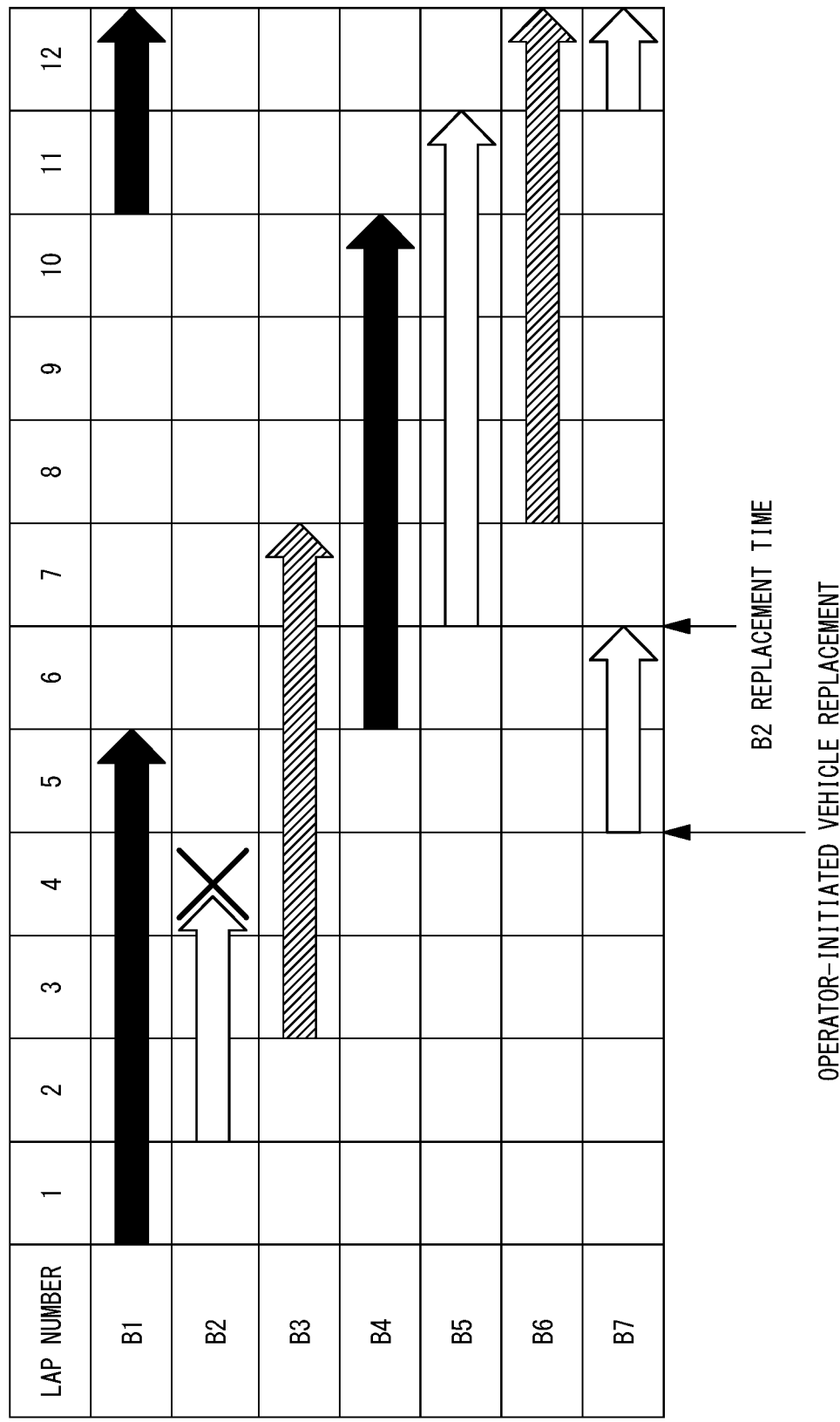
FIG. 6 is a diagram illustrating an example of the schedule illustrated in FIG. 5 being changed.

As illustrated in FIG. 6, suppose that the circulating bus B2 becomes inoperable due to a cause such as failure in the middle of the third lap.

In step S101, the controller 21 of the operation management apparatus 20 determines whether the current time is the replacement time. The current time is a point in time in the middle of the third lap specified by the schedule for the circulating bus B2. The replacement time is the point in time at the end of the fifth lap specified by the schedule for the circulating bus B2. The controller 21 determines not to implement normal vehicle replacement at the current time because the current time is not the replacement time.

In step S103, the controller 21 of the operation management apparatus 20 determines that the circulating bus B2 is inoperable.

In step S104, the controller 21 of the operation management apparatus 20 controls the communication interface 23 to transmit notification data notifying that the circulating bus B2 has become inoperable. The first terminal apparatus 30 displays the transmitted notification data on the display. The first terminal apparatus 30 accepts, from the manager 11, an operation to select whether to introduce, as the second vehicle 42, which substitutes for the circulating bus B2 corresponding to the first vehicle 41, a spare circulating bus B7. Assuming that introduction of the circulating bus B7 is selected, the first terminal apparatus 30 transmits, to the operation management apparatus 20, request data requesting that operator-initiated vehicle replacement be implemented. The controller 21 of the operation management apparatus 20 acquires the transmitted request data.

In step S105, the controller 21 of the operation management apparatus 20 compares the remaining number of laps for the circulating bus B2, until the replacement time, at the point in time at which the circulating bus B2 becomes inoperable, with the threshold Th. The remaining number of laps for the circulating bus B2 is two. The threshold Th is 1. Since the remaining number of laps is equal to or greater than the threshold Th, the controller 21 determines to operate the circulating bus B7 until the replacement time. That is, the controller 21 determines to implement operator-initiated vehicle replacement. The controller 21 notifies the manager 11 of compliance with the request.

In step S106, operator-initiated vehicle replacement is implemented. Specifically, the controller 21 of the operation management apparatus 20 controls the communication interface 23 to transmit second instruction data instructing that vehicle replacement be implemented. The circulating bus B2 returns to the garage 13 in accordance with the transmitted second instruction data. Alternatively, the circulating bus B2 is returned to the garage 13 by a tow vehicle in a case in which the circulating bus B2 is unable to return on its own. The circulating bus B7 leaves the garage 13 in accordance with the transmitted second instruction data and starts circulating. The point in time at which the circulating bus B7 starts circulating is the point in time at the start of the fourth lap specified by the schedule for the circulating bus B2.

The circulating bus B7 is operated until the replacement time specified by the schedule for the circulating bus B2. In other words, the point in time at which the circulating bus B7 ends circulating, that is, the point in time at which normal vehicle replacement is implemented for the circulating bus B7, is the point in time at the end of the fifth lap specified by the schedule for the circulating bus B2. Thereafter, in this example, the circulating bus B7 is operated so as to substitute for the circulating bus B2. For example, normal vehicle replacement is implemented between the overall 11th and 12th laps, and the circulating bus B7 starts circulating as a replacement for the circulating bus B5.

Figure 7:
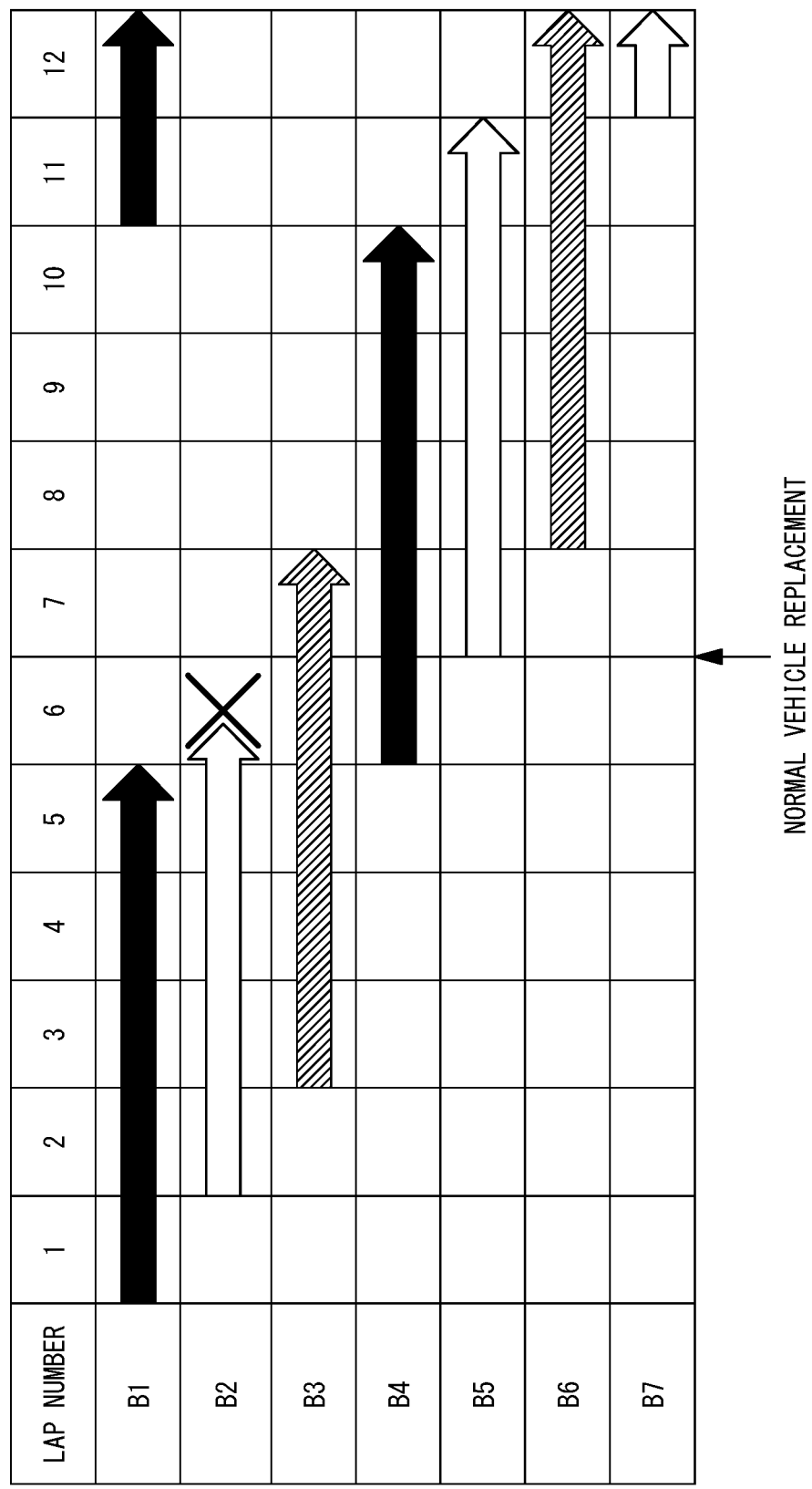
FIG. 7 is a diagram illustrating another example of the schedule illustrated in FIG. 5 being changed.

As illustrated in FIG. 7, suppose that the circulating bus B2 becomes inoperable due to a cause such as failure in the middle of the fifth lap.

In step S101, the controller 21 of the operation management apparatus 20 determines whether the current time is the replacement time. The current time is a point in time in the middle of the fifth lap specified by the schedule for the circulating bus B2. The replacement time is the point in time at the end of the fifth lap specified by the schedule for the circulating bus B2. The controller 21 determines not to implement normal vehicle replacement at the current time because the current time is not the replacement time.

In step S103, the controller 21 of the operation management apparatus 20 determines that the circulating bus B2 is inoperable.

In step S104, the controller 21 of the operation management apparatus 20 controls the communication interface 23 to transmit notification data notifying that the circulating bus B2 has become inoperable. The first terminal apparatus 30 displays the transmitted notification data on the display. The first terminal apparatus 30 accepts, from the manager 11, an operation to select whether to introduce, as the second vehicle 42, which substitutes for the circulating bus B2 corresponding to the first vehicle 41, the spare circulating bus B7. Assuming that introduction of the circulating bus B7 is selected, the first terminal apparatus 30 transmits, to the operation management apparatus 20, request data requesting that operator-initiated vehicle replacement be implemented. The controller 21 of the operation management apparatus 20 acquires the transmitted request data.

In step S105, the controller 21 of the operation management apparatus 20 compares the remaining number of laps for the circulating bus B2, until the replacement time, at the point in time at which the circulating bus B2 becomes inoperable, with the threshold Th. The remaining number of laps for the circulating bus B2 is zero. The threshold Th is 1. Since the remaining number of laps is less than the threshold Th, the controller 21 determines not to operate the circulating bus B7 until the replacement time. That is, the controller 21 determines not to implement operator-initiated vehicle replacement. The controller 21 notifies the manager 11 of non-compliance with the request.

The circulating bus B7 is not operated until the replacement time specified by the schedule for the circulating bus B2. However, from the replacement time specified by the schedule for the circulating bus B2 onward, in this example, the circulating bus B7 is operated so as to substitute for the circulating bus B2. For example, normal vehicle replacement is implemented between the overall 11th and 12th laps, and the circulating bus B7 starts circulating as a replacement for the circulating bus B5.

As described above, in the present embodiment, the controller 21 of the operation management apparatus 20 determines, in a case in which a first vehicle 41 that has been operated in accordance with a schedule specifying a point in time at which a circulating vehicle 40 is to be replaced becomes inoperable, whether to operate a second vehicle 42 that substitutes for the first vehicle 41 until a replacement time specified by the schedule, the replacement time being a point in time at which the first vehicle 41 is to be replaced. Specifically, the controller 21 determines whether to operate the second vehicle 42 until the replacement time according to the remaining number of laps for the first vehicle 41, until the replacement time, at the point in time at which the first vehicle 41 becomes inoperable. Therefore, according to the present embodiment, a conflict between normal vehicle replacement and operator-initiated vehicle replacement can be prevented.

As a variation of the present embodiment, the controller 21 of the operation management apparatus 20 may determine whether to operate the second vehicle 42 until the replacement time according to the remaining "time", until the replacement time, at the point in time at which the first vehicle 41 becomes inoperable. According to this variation, a conflict between normal vehicle replacement and operator-initiated vehicle replacement can be prevented, as in the case of determining whether to operate the second vehicle 42 until the replacement time according to the remaining "number of laps" at the point in time in a case in which the first vehicle 41 becomes inoperable.

Operations of the system 10 according to this variation will be described with reference to FIG. 8. These operations correspond to an operation management method according to this variation.

Figure 3:
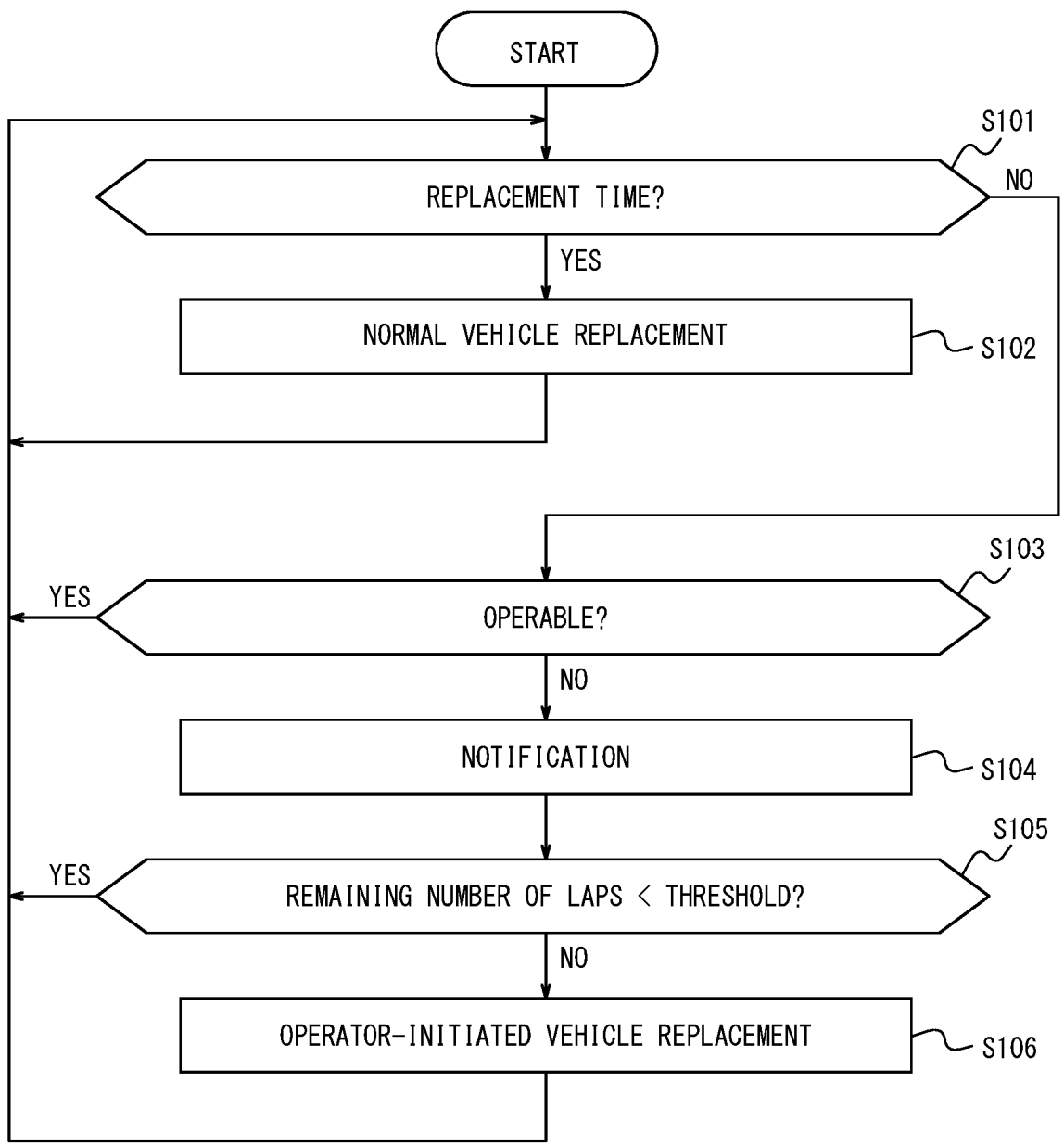
FIG. 3 is a flowchart illustrating operations of the system according to the embodiment of the present disclosure.

The processes in step S201 to step S204 are the same as the processes in step S101 to step S104 of FIG. 3, and thus descriptions thereof are omitted.

In step S205, the controller 21 of the operation management apparatus 20 compares the remaining time, until the replacement time, at the point in time at which the first vehicle 41 becomes inoperable, with a time Ti required to prepare the second vehicle 42 for introduction. The time Ti includes, for example, the time for the crew member 12 to board the second vehicle 42. In a case in which the remaining time is equal to or less than the time Ti, the controller 21 determines not to operate the second vehicle 42 until the replacement time. That is, the controller 21 determines not to implement operator-initiated vehicle replacement. Specifically, even if the request data is acquired in step S204, the controller 21 determines not to comply with a request from the manager 11, and notifies the manager 11 of non-compliance with the request. The process in step S201 is then executed again. In a case in which the remaining time is longer than the time Ti, the controller 21 determines to operate the second vehicle 42 until the replacement time. That is, the controller 21 determines to implement operator-initiated vehicle replacement. Specifically, if the request data is acquired in step S204, the controller 21 determines to comply with a request from the manager 11, and notifies the manager 11 of compliance with the request. The process in step S206 is then executed. If request data is not acquired in step S204, the controller 21 may determine not to implement operator-initiated vehicle replacement. In that case, the process in step S201 is executed again.

The process in step S206 is the same as the process in step S106 of FIG. 3, and thus a description thereof is omitted.

As another variation of the present embodiment, in a case in which the first vehicle 41 becomes inoperable, the location at which the first vehicle 41 becomes inoperable may be set as a temporary stop. For example, at that stop, all passengers on board the first vehicle 41 may alight. In a case in which operator-initiated vehicle replacement is implemented, operation of the second vehicle 42 may be started from that stop.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. An operation management apparatus comprising:
a communication interface configured to wirelessly communicate with a plurality of vehicles, each of which is an autonomous vehicle to be operated without a driver in accordance with a schedule, the schedule specifying:
points in time at which a predetermined number of vehicles among the plurality of vehicles are to, in order, leave a garage to circulate N laps along a same route while remaining vehicles among the plurality of vehicles are on standby at the garage, where N is an integer greater than one; and
a replacement time at which each vehicle that has circulated N laps is to return to the garage to be on standby at the garage and a vehicle that has been on standby at the garage is to, in place of the each vehicle, leave the garage to circulate N laps along the same route, the replacement time being specified for the each vehicle; and
a controller configured to:
upon detecting a first vehicle that has circulated M laps along the same route and become inoperable before returning to the garage, calculate a remaining number of laps (N–M) with reference to the schedule, where M is an integer equal to or less than N;
determine not to operate a second vehicle, among the remaining vehicles, that substitutes for the first vehicle until the replacement time specified for the first vehicle by the schedule, in a case in which the calculated remaining number of laps is less than a threshold; and
determine to operate the second vehicle, in a case in which the calculated remaining number of laps is equal to or greater than the threshold, and control the communication interface to wirelessly transmit instruction data to the second vehicle, the instruction data instructing that the second vehicle autonomously leaves the garage to circulate (N–M) laps along the same route and autonomously returns to the garage at the replacement time specified for the first vehicle by the schedule.

2. The operation management apparatus of claim 1, wherein the threshold is 1.

3. The operation management apparatus of claim 1, wherein the plurality of vehicles includes as each vehicle a circulating bus configured to be operated without a driver.

4. The operation management apparatus of claim 1,
wherein the communication interface is configured to wirelessly communicate with a terminal apparatus, and
the controller is configured to, upon detecting the first vehicle, control the communication interface to wirelessly transmit notification data notifying that the first vehicle has become inoperable to the terminal apparatus, and determine to operate the second vehicle, in a case in which the calculated remaining number of laps is equal to or greater than the threshold and request data requesting that the second vehicle be operated is wirelessly received from the terminal apparatus by the communication interface.

5. A system comprising:
the operation management apparatus of claim 1; and
the plurality of vehicles.

6. The system of claim 5, wherein the plurality of vehicles includes as each vehicle a battery electric vehicle to be charged using a charging facility in the garage while on standby.

7. An operation management apparatus comprising:
a communication interface configured to wirelessly communicate with a plurality of vehicles, each of which is an autonomous vehicle to be operated without a driver in accordance with a schedule, the schedule specifying:
points in time at which a predetermined number of vehicles among the plurality of vehicles are to, in order, leave a garage to circulate N laps along a same route while remaining vehicles among the plurality of vehicles are on standby at the garage, where N is an integer greater than one; and
a replacement time at which each vehicle that has circulated N laps is to return to the garage to be on standby at the garage and a vehicle that has been on standby at the garage is to, in place of the each vehicle, leave the garage to circulate N laps along the same route, the replacement time being specified for the each vehicle; and
a controller configured to:
upon detecting a first vehicle that has circulated M laps along the same route and become inoperable before returning to the garage, calculate a remaining time until the replacement time specified for the first vehicle by the schedule, where M is an integer equal to or less than N;
determine not to operate a second vehicle, among the remaining vehicles, that substitutes for the first vehicle until the replacement time specified for the first vehicle by the schedule, in a case in which the calculated remaining time is equal to or less than a time required to prepare the second vehicle for introduction into the same route; and
determine to operate the second vehicle, in a case in which the calculated remaining time is longer than the time required to prepare the second vehicle for the introduction, and control the communication interface to wirelessly transmit instruction data to the second vehicle, the instruction data instructing that the second vehicle autonomously leaves the garage to circulate (N−M) laps along the same route and autonomously returns to the garage at the replacement time specified for the first vehicle by the schedule.

8. The operation management apparatus of claim 7, wherein the plurality of vehicles includes as each vehicle a circulating bus configured to be operated without a driver.

9. The operation management apparatus of claim 7,
wherein the communication interface is configured to wirelessly communicate with a terminal apparatus, and
the controller is configured to, upon detecting the first vehicle, control the communication interface to wirelessly transmit notification data notifying that the first vehicle has become inoperable to the terminal apparatus, and determine to operate the second vehicle, in a case in which the calculated remaining time is longer than the time required to prepare the second vehicle for the introduction and request data requesting that the second vehicle be operated is wirelessly received from the terminal apparatus by the communication interface.

10. A system comprising:
the operation management apparatus of claim 7; and
the plurality of vehicles.

11. The system of claim 10, wherein the plurality of vehicles includes as each vehicle a battery electric vehicle to be charged using a charging facility in the garage while on standby.

12. An operation management method comprising:
wirelessly communicating with a plurality of vehicles, each of which is an autonomous vehicle to be operated without a driver in accordance with a schedule, the schedule specifying:
points in time at which a predetermined number of vehicles among the plurality of vehicles are to, in order, leave a garage to circulate N laps along a same route while remaining vehicles among the plurality of vehicles are on standby at the garage, where N is an integer greater than one; and
a replacement time at which each vehicle that has circulated N laps is to return to the garage to be on standby at the garage and a vehicle that has been on standby at the garage is to, in place of the each vehicle, leave the garage to circulate N laps along the same route, the replacement time being specified for the each vehicle;
upon detecting a first vehicle that has circulated M laps along the same route and become inoperable before returning to the garage, calculating a remaining number of laps (N−M) with reference to the schedule or calculating a remaining time until the replacement time specified for the first vehicle by the schedule, where M is an integer equal to or less than N;
determining not to operate a second vehicle, among the remaining vehicles, that substitutes for the first vehicle until the replacement time specified for the first vehicle by the schedule, in a case in which the calculated remaining number of laps is less than a threshold or the calculated remaining time is equal to or less than a time required to prepare the second vehicle for introduction into the same route; and
determining to operate the second vehicle, in a case in which the calculated remaining number of laps is equal to or greater than the threshold or the calculated remaining time is longer than the time required to prepare the second vehicle for the introduction, and wirelessly transmitting instruction data to the second vehicle, the instruction data instructing that the second vehicle autonomously leaves the garage to circulate (N−M) laps along the same route and autonomously returns to the garage at the replacement time specified for the first vehicle by the schedule.

13. The operation management method of claim 12, wherein the threshold is 1.

* * * * *